(12) United States Patent
Branscome

(10) Patent No.: US 9,213,639 B2
(45) Date of Patent: Dec. 15, 2015

(54) DIVISION OF NUMERICAL VALUES BASED ON SUMMATIONS AND MEMORY MAPPING IN COMPUTING SYSTEMS

(71) Applicant: Jeremy Branscome, Santa Clara, CA (US)

(72) Inventor: Jeremy Branscome, Santa Clara, CA (US)

(73) Assignee: Teradata US, Inc., Dayton, OH (US)

( * ) Notice: Subject to any disclaimer, the term of this patent is extended or adjusted under 35 U.S.C. 154(b) by 340 days.

(21) Appl. No.: 13/626,799

(22) Filed: Sep. 25, 2012

(65) Prior Publication Data

US 2014/0089632 A1 Mar. 27, 2014

(51) Int. Cl.
*G06F 12/06* (2006.01)
*G06F 7/535* (2006.01)

(52) U.S. Cl.
CPC ............ *G06F 12/0607* (2013.01); *G06F 7/535* (2013.01); *G06F 2207/5355* (2013.01); *G06F 2207/5356* (2013.01)

(58) Field of Classification Search
None
See application file for complete search history.

(56) References Cited

U.S. PATENT DOCUMENTS

| | | | | |
|---|---|---|---|---|
| 5,249,149 A * | 9/1993 | Cocanougher et al. | ........ | 708/504 |
| 5,307,303 A * | 4/1994 | Briggs et al. | ................... | 708/654 |
| 6,330,000 B1 * | 12/2001 | Fenney et al. | ................. | 345/586 |
| 8,140,608 B1 * | 3/2012 | Juffa | ............................. | 708/650 |
| 2005/0289209 A1 * | 12/2005 | Robison | ....................... | 708/650 |

\* cited by examiner

*Primary Examiner* — Michael D Yaary
(74) *Attorney, Agent, or Firm* — Ramin Mahboubian

(57) ABSTRACT

Divisions by numbers that are not divisible by two (2) can be performed in a computing system based on a summation that estimates and/or approximates the reciprocal of the dividing number or denominator value. By way of example, dividing by three (3) can be calculated based on a summation that approximates or estimates one third (⅓) represented as the sum of a selected group of the inverses of the powers of two (2) in a pattern, namely the sum of: ¼, ¹⁄₁₆, ¹⁄₆₄, ¹⁄₂₅₆, . . . ). Applications of the division techniques are virtually unlimited and include memory mapping of global memory addresses to memory channel addresses by dividing a global memory address into the number of memory channels, allowing memory mapping to be performed in an efficient manner even for large memory spaces using a number of memory channels that are not divisible by two, including prime numbers.

16 Claims, 8 Drawing Sheets

| Integer Range [#, #] | Modulo Result Class |
|---|---|
| 0 | Unexpected for sufficiently small $(D,k)$ unless $D=0$ |
| $[1, G]$ | $[1]$ |
| $[G+1, 2G]$ | $[2]$ |
| ... | ... |
| $[(N-2)G+1, (N-1)G]$ | $[N-1]$ |
| $[(N-1)G+1, (NG]$ | $[0]$ |

| $Q$ modulo Values ($P$ = 2 bits) | $Q$ | Modulo |
|---|---|---|
| 0 | Unexpected unless $D$ = 0 | |
| 1 | Drop decimal part | 1 |
| 2 | Drop decimal part | 2 |
| 3 | Drop decimal AND Q++ | 0 |

FIG. 4

| $Q$ modulo Values ($P$ = 4 bits) | $Q$ | Modulo |
|---|---|---|
| 0 | Unexpected unless $D$ = 0 | |
| 3 | Drop decimal part | 1 |
| 6 | Drop decimal part | 2 |
| ... | ... | ... |
| 12 | Drop decimal part | 4 |
| 15 | Drop decimal AND Q++ | 0 |

FIG. 5

| $Q$ modulo Values ($P$ = 10 bits) | $Q$ | Modulo |
|---|---|---|
| 0 | Unexpected unless $D$ = 0 | |
| 93 | Drop decimal part | 1 |
| 186 | Drop decimal part | 2 |
| ... | ... | ... |
| 930 | Drop decimal part | 10 |
| 1023 | Drop decimal AND Q++ | 0 |

DIVISION OF NUMERICAL VALUES BASED ON SUMMATIONS AND MEMORY MAPPING IN COMPUTING SYSTEMS

BACKGROUND

Computers or computing systems can perform arithmetic operations, including numerical divisions using a binary representation of data (i.e., using bit values of zero (0) and one (1)). In binary arithmetic, division by two can be performed by a bit shift operation that shifts the number one place to the right. This is a form of strength reduction optimization. For example, "1101001" in binary (the decimal number 105), shifted one place to the right, is "110100" (the decimal number 52): the lowest order bit, a 1, is removed. Similarly, division by any power of two $2^k$ may be performed by right-shifting k positions. However, division in general, and especially division of large numbers by number that are not divisible by two, including prime numbers, can be a very time consuming.

Conventional techniques are generally known in the art for dividing numbers in a computing system. A number of the conventional techniques produce one digit of the final quotient per iteration and are known as "slow division techniques (e.g., restoring, non-performing restoring, non-restoring, and SRT division). Other conventional techniques, which are known as "fast division," start with a close approximation to the final quotient and produce twice as many digits of the final quotient in each of the succeeding iterations.

One important aspect of computing and computing systems is memory and memory mapping. In particular, computer systems that operate with relatively large amounts of memory (e.g., main memory provided as Random Access Memory (RAM)) can generally use a contiguous system-wide global addressing space through which each main memory location may be addressed, for example, by at least one CPU and/or other devices without concern for how the memory (e.g., RAM) itself may be physically organized in the system. In contrast to this requirement, the desire for accessing memory (e.g., RAM) with a high bandwidth and physical signaling problems, generally lead to the memory being partitioned into separate, independently accessible groups, hereinafter called "memory channels". This means that there is a need for mapping a given Global Address (GA) to a Channel Address (CA) which is an address corresponding to a particular one of multiple memory channels.

One form of a computing system that is especially useful and prevalent today is a database or database system capable of storing data. As such, data and databases are discussed in greater detail below.

Data can be an abstract term. In the context of computing environments and system, data can generally encompass all forms of information storable in a computer readable medium (e.g., memory, hard disk). Data and in particular, one or more instances of data can also be referred to as data object(s). As is generally known in the art, a data object can for example, be an actual instance of data, a class, type, or form data, and so on.

The term database can refer to a collection of data and/or data structures typically stored in a digital form. Data can be stored in a database for various reasons and to serve various entities or "users." Generally, data stored in the database can be used by the database users. A user of a database can, for example, be a person, a database administrator, a computer application designed to interact with a database, etc. A very simple database or database system can, for example, be provided on a Personal Computer (PC) by storing data on a Hard Disk (e.g., contact information) and executing a computer program that allows access to the data. The executable computer program can be referred to as a database program or a database management program. The executable computer program can, for example, retrieve and display data (e.g., a list of names with their phone numbers) based on a request submitted by a person (e.g., show me the phone numbers of all my friends in Ohio).

Generally, database systems are much more complex than the example noted above. In addition, databases have evolved over the years and are used in various businesses and organizations (e.g., banks, retail stores, governmental agencies, universities). Today, databases can be very complex. Some databases can support several users simultaneously and allow them to make very complex queries (e.g., give me the names of all customers under the age of thirty five (35) in Ohio that have bought all the items in a given list of items in the past month and also have bought a ticket for a baseball game and purchased a baseball hat in the past 10 years).

Typically, a Database Manager (DM) or a Database Management System (DBMS) is provided for relatively large and/or complex databases. As known in the art, a DBMS can effectively manage the database or data stored in a database, and serve as an interface for the users of the database. A DBMS can be provided as an executable computer program (or software) product as is also known in the art.

It should also be noted that a database can be organized in accordance with a Data Model. Notable Data Models include a Relational Model, an Entity-relationship model, and an Object Model. The design and maintenance of a complex database can require highly specialized knowledge and skills by database application programmers, DBMS developers/programmers, database administrators (DBAs), etc. To assist in design and maintenance of a complex database, various tools can be provided, either as part of the DBMS or as free-standing (stand-alone) software products. These tools can include specialized Database languages (e.g., Data Description Languages, Data Manipulation Languages, Query Languages). Database languages can be specific to one data model or to one DBMS type. One widely supported language is Structured Query Language (SQL) developed, by in large, for Relational Model and can combine the roles of Data Description Language, Data Manipulation language, and a Query Language.

Today, databases have become prevalent in virtually all aspects of business and personal life. Moreover, database use is likely to continue to grow even more rapidly and widely across all aspects of commerce. Generally, databases and DBMS that manage them can be very large and extremely complex partly in order to support an ever increasing need to store data and analyze data. Typically, larger databases are used by larger organizations. Larger databases are supported by a relatively large amount of capacity, including computing capacity (e.g., processor and memory) to allow them to perform many tasks and/or complex tasks effectively at the same time (or in parallel). On the other hand, smaller databases systems are also available today and can be used by smaller organizations. In contrast to larger databases, smaller databases can operate with less capacity.

A popular type of database in use today is the relational database with a Relational Database Management System (RDBMS), which includes relational tables, also referred to as relations, made up of rows and columns (also referred to as tuples and attributes). In a relational database, each row represents an occurrence of an entity defined by a table, with an entity being a person, place, thing, or other object about which the table contains information.

In view of the foregoing, techniques for division and memory mapping are useful for various computer systems and environments, including, for example, database systems and environments.

SUMMARY

Broadly speaking, the invention relates to computing environments and systems. More particularly, the invention relates to techniques for dividing number in computing systems and environments, and its applications (e.g., memory mapping in computing systems and environments).

In accordance with one aspect of the invention, divisions by numbers, including numbers that are not divisible by two (2) can be performed in a computing system based on a summation that estimates and/or approximates the reciprocal of the dividing number or denominator value. By way of example, dividing by three (3) can be calculated based on a summation that approximates or estimates the reciprocal of three (3), or one third ($\frac{1}{3}$). It should be noted that the summation of reciprocal of the dividing number can be based on one or more reciprocal of powers of two (2) that can be calculated efficiently in a computing system. The summation of reciprocal of the dividing number (or denominator value) can also be represented as a repeating bit pattern and calculated, for example, based on a determined or desired error value.

By way of example, considering three (3) as a very simple example of a denominator value M, its reciprocal value (1/M) can be represented as the sum of a selected group of the inverses of the powers of two (2) in a repeating pattern, namely the sum of: $\frac{1}{4}$, $\frac{1}{16}$, $\frac{1}{64}$, $\frac{1}{256}$, ... ). In other words, this summation can be represented as a repeating bit pattern where every other bit is on {0.010101010101 ... } where the first significant bit right of the decimal point represents the inverse $\frac{1}{2}$ (which is "off", or zero (0) in this example), the second bit represent the inverse $\frac{1}{4}$ (which is "on", or one (1) in this example) and so on.

In accordance with another aspect of the invention, global memory addresses of a global memory space can be effectively mapped to memory channel addresses of a memory channel space with multiple memory channels (or channels) by using a summation that estimates and/or approximates the reciprocal of the number of memory channels as a dividing number or denominator value. In doing so, a given global memory address can be divided as a numerical value by the number of memory channels configured for a given computing system. The resulting quotient of the division can represent a channel memory address of a memory channel identified by the resulting remainder of the division. It will be appreciated that the summation can be pipelined as multiple parallel operations in computing system, thereby allowing memory to be mapped in an efficient manner even for large memory spaces and relatively large numbers of memory channels that are not divisible by two, including prime numbers (e.g., 3, 5, 7, 11, 13, 17, 19, 23, 29, 31, 37, 41, 43, 47, 53, 59, 61, 67, 71).

Still other aspects, embodiment and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which:

FIG. 2 depicts a modulo mapping that can be expressed in terms of N equivalence classes [0], [1], . . . , [N−1] in accordance with one exemplary embodiment of the invention.

FIGS. 3-5 depict interpretation of bits for division operations in accordance with one exemplary embodiments of the invention.

DETAILED DESCRIPTION

Figure 1:
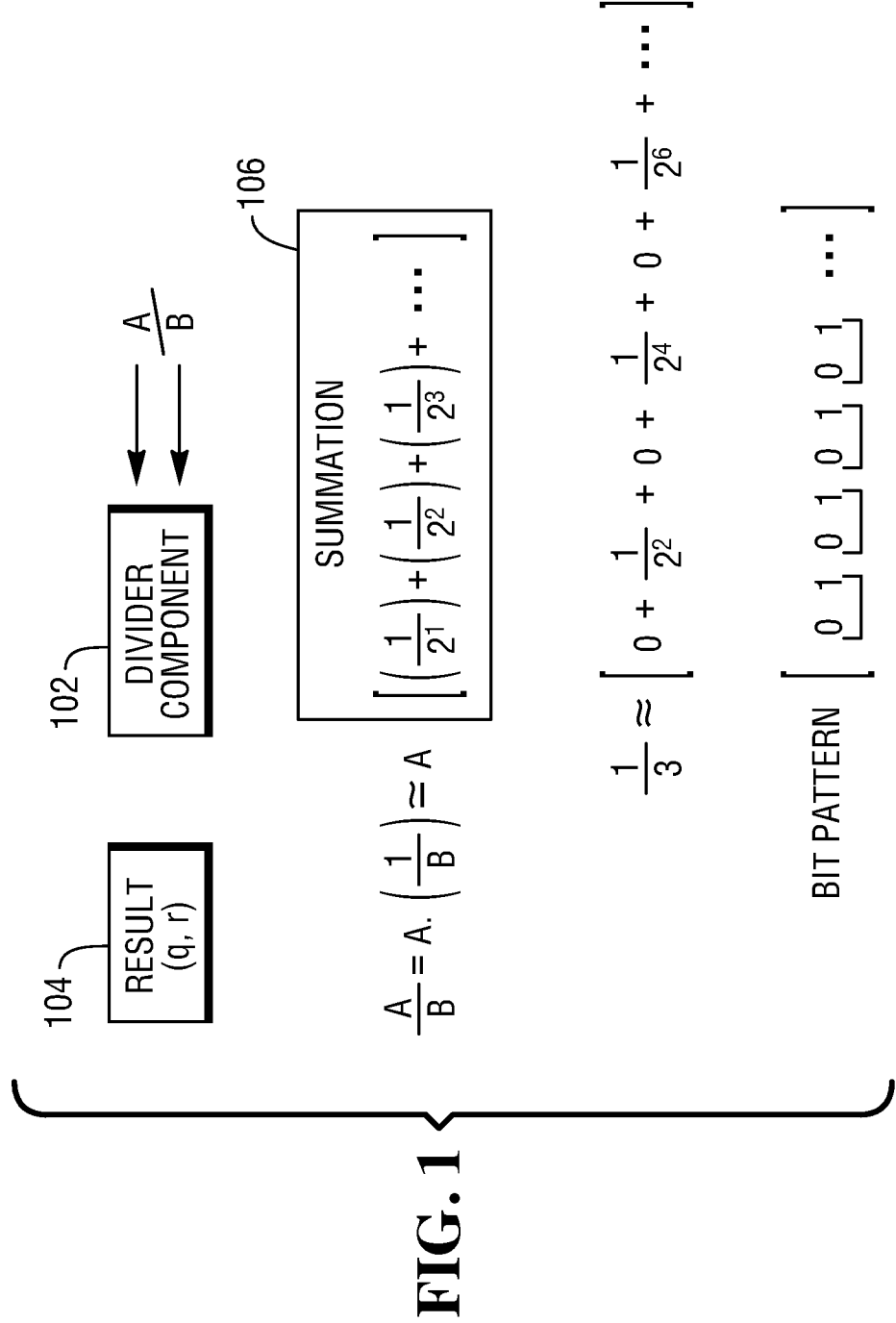
FIG. 1 depicts a divider component in accordance with one embodiment of the invention.
Figure 6:
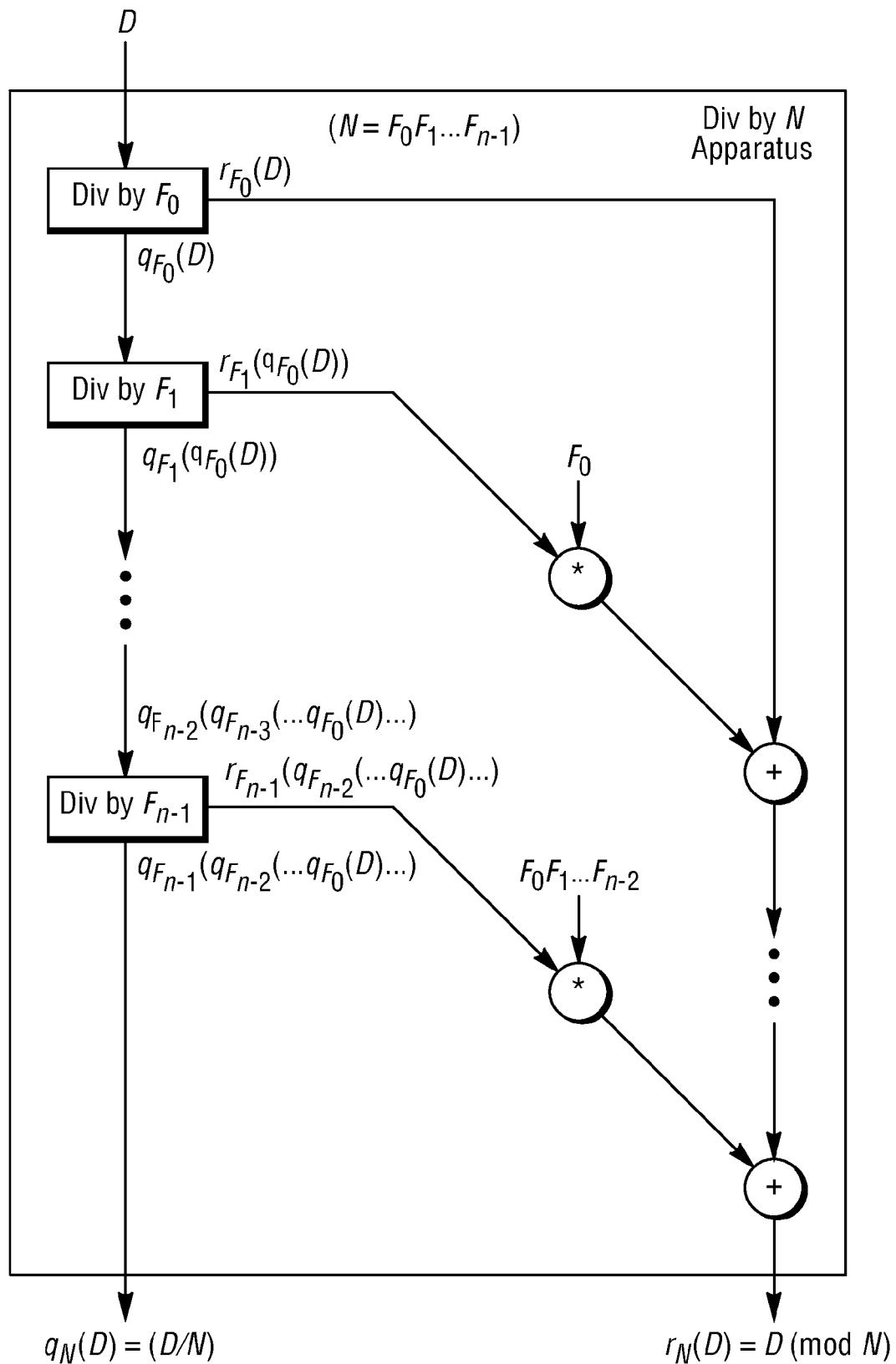
FIG. 6 depicts a generalized compositional approach schematically in accordance with one embodiment of the invention.

As noted in the background section, in computing systems, it can be time consuming to divide larger numbers by numbers that are not divisible by two (2). In other words, conventional techniques for division in computing system generally rely on iterative computations, where a computation is dependent on a previous calculation that has to be computed first. As a result, the conventional techniques do not readily allow computations to be performed in parallel to divide numbers. Consequently dividing large numbers by a number that is not divisible by two (2) can be computationally expensive and time consuming.

This limitation can adversely affect virtually all aspects of computing and applications that require division of values that are not divisible by two (2). One important area of computing that has been affected by this limitation is memory mapping.

As noted above, computer systems that operate with relatively large amounts of memory (e.g., main memory provided as Random Access Memory) (RAM)) can generally use a contiguous system-wide global addressing space through which each main memory location may be addressed, for example, by at least one CPU and/or other devices without concern for how the memory (e.g., RAM) itself may be physically organized in the system. In contrast to this requirement, the desire for high RAM access bandwidth and physical signaling problems, generally lead to the memory being partitioned into separate, independently accessible groups, hereinafter called "memory channels". This means that there is a need for mapping a given global address (GA) to a channel address (CA) which is an address corresponding to a particular one of multiple memory channels.

Given that conventional techniques for dividing by numbers that are not divisible by two (2) are relatively time consuming, conventional computing systems limit memory mapping to a very small number of channels that is divisible by two (2). By and large, only two (2) memory channels may be provided in computing systems since division and dividing by two (2) can be implemented efficiently by shifting bits in order to map a global address (GA) to a channel address (CA).

Although it may possible to store the results of the divisions and look them up, it may not be desirable or feasible to take this approach today and/or in the future, given that the number of global addresses that are used today is as large as the size of memory is in Gigabytes even for smaller devices and the size of memory is likely to grow even more in the future. Also, this approach becomes even less feasible if there is a need or desire to provide the ability to change the number of memory channels.

As such, it will be appreciated that divisions by numbers, including numbers that are not divisible by two (2) can be performed in a computing system based on a summation that estimates and/or approximates the reciprocal of the dividing number or denominator value, in accordance with one aspect of the invention. By way of example, dividing by three (3) can be calculated based on a summation that approximates or estimates the reciprocal of three (3), or one third (⅓). It should be noted that the summation of the reciprocal of the dividing number can be based on one or more reciprocal of powers of two (2) that can be calculated efficiently in a computing system. The summation of reciprocal of the dividing number (or denominator value) can also be represented as a repeating bit pattern and calculated, for example, based on a determined or desired error bound.

By way of example, considering three (3) as a very simple example of a denominator value M, its reciprocal value (1/M) can be represented as the sum of a selected group of the inverses of the powers of two (2) in a repeating pattern, namely the sum of: ¼, ¹⁄₁₆, ¹⁄₆₄, ¹⁄₂₅₆, . . . ). In other words, this summation can be represented as a repeating bit pattern where every other bit is on {0.010101010101 . . . } where the first significant bit right of the decimal represents the inverse ½ (which is off or zero in this example), the second bit represents the inverse ¼ (which is one or one (1) in this example) and so on.

In accordance with another aspect of the invention, global memory addresses of a global memory space can be effectively mapped to memory channel addresses of a memory channel space with multiple memory channels (or channels) by using a summation that estimates and/or approximates the reciprocal of the number of memory channels as a dividing number or denominator value. In doing so, a given global memory address can be divided as a numerical value by the number of memory channels configured for a given computing system. The resulting quotient of the division can represent a channel memory address of a memory channel identified by the resulting remainder of the division. It will be appreciated that the summation can be pipelined as multiple parallel operations in computing system, thereby allowing memory to be mapped in an efficient manner even for large memory spaces and relatively large numbers of memory channels that are not divisible by two, including prime numbers (e.g., 3, 5, 7, 1113, 17, 19, 23, 29, 31, 37, 41, 43, 47, 53, 59, 61, 67, 71).

Embodiments of these aspects of the invention are also discussed below with reference to FIGS. 1-10. However, those skilled in the art will readily appreciate that the detailed description given herein with respect to these figures is for explanatory purposes as the invention extends beyond these limited embodiments.

FIG. 1 depicts a divider component 102 in accordance with one embodiment of the invention. Although not shown in FIG. 1, those skilled in the art will readily appreciate that the divider component 102 can, for example, be provided as executable computer code stored in memory and executed by one or more processors of a computing device (e.g., a computer).

Referring to FIG. 1, the divider component 102 can determine one or more results 104 (e.g. resulting or resultant numerical values) for a division of two numerical values (or numbers), where a first numerical value (or number) A is divided by a second numerical value B (i.e., A/B, where A is the numerator and B is the denominator). A and B can, for example, represent one or more physical attributes or measurements, or be one or more attributes associated with a computing system (e.g., memory addresses). Typically, the result(s) 104 can include one or more result values, including a quotient value (q) and a remainder (r) (e.g., modulo result value)

It will be appreciated that the divider component 102 can determine that the result 104 based on a summation representing the reciprocal of the denominator value (B), namely, the value (1/B). Moreover, it will be appreciated that a summation 106 representing the reciprocal of the denominator value B (1/B) can be a summation of one or more inverses of the powers of two (2) (e.g., ½, ¼, ⅛, ¹⁄₁₆, ¹⁄₃₂, . . . ) even for values of B that are not divisible by two (2) including prime numbers (e.g., 3, 5, 7, 11). In other words, the reciprocal of the denominator value B (1/B) can be determined based on the sum of one or more selected inverses of the powers of two (2) (e.g., ½, ¼, ⅛, ¹⁄₁₆, ¹⁄₃₂) even for values of B that are not divisible by two (2). It should be noted that value of the numerator (A) can be effectively distributed or factored across the terms of the summation in order to calculate the division. It will also be appreciated that the values of the denominator B that are not divisible by two (2), including prime numbers (e.g., 3, 5, 7, 11), can be represented as a number of repeating bits (or pattern) in a binary representation.

By way of example, considering the prime number three (3) as a very simple example of a denominator value B, its reciprocal value (1/B) can be represented as the sum of a selected group of the inverses of the powers of two (2) in a pattern, namely the sum of: ¼, ¹⁄₁₆, ¹⁄₆₄, ¹⁄₂₅₆). This summation can be represented as a repeating bit pattern where every other bit is on {01, 01, 01, 01, 01, 01, . . . } where the first significant bit represents the inverse ½ (which is off or zero in this example), and the second bit represent the inverse ¼ (which is one or one (1) in this example) and so on.

As will be discussed in greater detail below, other prime numbers can be represented in a similar manner as a summation that can be evaluated based on selected inverses of two (2). As a result, the summation can be calculated very effectively by computing systems using calculation based on powers two (2) in a binary representation. Furthermore, the summation 106 can be calculated in a non-iterative manner, where by and large the result of a calculation is not dependent on the result of a previous calculation. As a result, the task of calculating the summation 104 can be divided up and calculated in parallel or pipelined to achieve significantly faster results than would be possible by using iterative-based conventional techniques for division of numerical values that are not divisible by two (2).

In general, any reciprocal of any number, including natural numbers, can be represented in any number base, by a possibly repeating sum of distinct fractional values in the base, with a period of repetition equivalent to the multiplicative order of the number N with respect to the number base. These characteristic quantities can be represented as the set of distinct base powers {j} (expressed as positive integers here, by convention), which can represent the necessary fractional components and which always exist; and the period P, if the multiplicative order exists for N with respect to the base. In particular, rational numbers can be represented a finite set of set of distinct base powers {j} possibly as a repeating sum.

When P exists for N (with respect to base 2), a given natural number reciprocal R can be represented exactly in binary with an infinite series as:

$$R = \frac{1}{N} = \sum_{\{j\}} \sum_{i=0}^{\infty} 2^{-(Pi+j)} = \frac{1}{1-2^{-P}} \sum_{\{j\}} 2^{-j}$$

Otherwise, when P does not exist for N (with respect to base 2), but N is a composite number of n factors {F0, F1, ..., Fn−1}, R may be represented as a product of contributions from each factor, as in:

$$R = \frac{1}{F_0}\frac{1}{F_1} \cdots \frac{1}{F_{n-1}} =$$

$$\left(\frac{1}{1-2^{-P_0}}\sum_{\{j_0\}} 2^{-j_0}\right)\left(\frac{1}{1-2^{-P_1}}\sum_{\{j_1\}} 2^{-j_1}\right) \cdots \left(\frac{1}{1-2^{-P_{n-1}}}\sum_{\{j_{n-1}\}} 2^{-j_{n-1}}\right)$$

where P0 is the multiplicative order of F0 with respect to base 2 and {j0} is the set of appropriate powers of 2 repeated over P0 for factor F0; P1 and {j1} are appropriate values for F1; and so on.

When N is a power of 2, P does not exist for N (with respect to base 2), but R may be represented in binary as:

$$\left(R = \frac{1}{N} = \sum_{\{j\}} 2^{-j}\right)$$

which can be degenerated into a simpler case of a finite representation, where again {j} is the distinct set of powers of 2, expressed as positive integers.

Generalizing slightly more to the case where M>1, any positive rational can then be represented using an additional multiplication, as in:

$$\left(\frac{M}{N} = MR\right).$$

In other words, any division of dividend D by a positive rational N/M can be expressed as:

$$Q = \frac{D}{N/M} = M\left(\frac{1}{N}\right)D = MRD.$$

It should be noted that unlike the example shown in FIG. 1, here, the symbol M is used for the numerator and symbol N is used for the denominator)

One consideration is the error incurred in the product RD, as a function of the number of terms, k, used in the necessarily finite form of the infinite sum. Disregarding the full precision of the accumulator(s) used in summation, the error can be:

$$\varepsilon(D,k) = D\left(\frac{2^{-Pk}}{1-2^{-P}}\sum_{\{j\}} 2^{-j}\right) = DR \cdot 2^{-Pk}.$$

A second consideration is how to derive the modulo result, at least well enough to round to the appropriate integer quotient. Because P is the multiplicative order of N with respect to 2, $2^P \equiv 1 \pmod{N}$.

This, in turn, says that a binary field of P bits, removing the value 0, is evenly divisible into N uniform ranges, which ranges may then be mapped directly to the modulo result of the division, given at least P bits of additional precision and sufficiently small $\epsilon(D,k)$.

Let G be the integer size of each subrange in $$G = \frac{2^P - 1}{N},$$

then modulo mapping can be expressed in terms of N equivalence classes [0], [1], ..., [N−1], as depicted in FIG. 2.

Generally, main error sources involved in using finite arithmetic to perform this division include: number of terms used (i.e. $\epsilon(D,k)$), and accumulator width. To ensure acceptable convergence, it can be useful to require:

$$\epsilon(D,k) \leq \max(R - 2^{-P}, 2^{-P})$$

which means that k may be chosen such that $$Pk > \log(D) + \log(R) - \log(R - 2^{-P})$$

or, depending on the maximum, $$Pk > \log(D) + \log(R) + P.$$

This requirement is likely the maximum reasonable error to permit in the computation.

However, an even tighter requirement, which basically reduces the modulo mapping to involve only the distinct mappings G→[1], 2G→[2], ..., (N−1)G→[N−1], NG→[0], can be: $\epsilon(D,k) \leq \min(R - 2^{-P}, 2^{-P})$ which may well require k to be slightly larger. This tighter requirement may involve more additions, but reduces the modulo detection to simpler comparisons, instead of range tests.

The accumulator width, as the second error source, can be significant when the width is smaller than M=log(D)+Pk. At the same time, M is larger than typically necessary to maintain sufficient precision. An acceptable total accumulator width (which keeps the error sufficiently small) can be approximated by satisfying the relationship:

$$\log\left(k - \frac{\Delta}{P}\right) - \Delta < -P - 1,$$

where the recommended actual accumulator width is then log(D)+Δ<M, instead of M. This result can be somewhat pessimistic, requiring more bits than absolutely necessary, but can be a reasonable approximation.

Some examples of division by prime numbers are discussed in greater detail below in accordance with exemplary embodiments of the invention.

Divide by 3 can be characterized by P=2 and {j}={2}. Given this, the reciprocal R can be determined based on:

$$R = \frac{1}{3} = \sum_{\{j\}} \sum_{i=0}^{\infty} 2^{-(2i|j)} = \frac{1}{1-2^{-2}}(2^{-2}),$$

while making careful consideration of precision. Mod 3 can be also computed in the same process.

For a maximum dividend of value D, the number of series terms, k, necessary to bound the error is: $\epsilon(D,k) < \max(R-2^{-2}, 2^{-2})$ which gives:

$$2k > \log(2^{40}) + \log\left(\frac{1}{3}\right) + 2,$$

meaning k=21 for a 40-bit dividend value. The necessary accumulator width can be approximated by finding the smallest $\Delta$ which satisfies:

$$\log\left(21 - \frac{\Delta}{2}\right) - \Delta < -2 - 1.$$

The smallest $\Delta=8$, meaning the accumulator is safest with width of log(D)+8=48 bits or more.

Due to the error bound, the first P=2 bits to the right of the implicit binary decimal of Q can be interpreted as the modulo in the manner depicted in FIG. 2 in accordance with one exemplary embodiment of the invention.

As another example, Divide by 5 can be characterized by P=4 and {j}={3, 4}. Given:

$$R = \frac{1}{5} = \sum_{\{j\}} \sum_{i=0}^{\infty} 2^{-(4i+j)} = \frac{1}{1-2^{-4}}(2^{-3} + 2^{-4}),$$

the value for k for a 40-bit dividend would be governed by $$Pk > \log(2^{40}) + \log\left(\frac{1}{5}\right) - \log\left(\frac{1}{5} - 2^{-4}\right) = 41,$$

or about k=11.

The necessary accumulator width is safely approximated by finding the smallest $\Delta$ which satisfies $$\log\left(11 - \frac{\Delta}{4}\right) - \Delta < -4 - 1.$$

The smallest $\Delta=9$, meaning the accumulator should be log(D)+9=49 bits. Referring to FIG. 3, the modulo values can be computed from the first P=4 bits to the right of the implicit decimal of Q, using exact comparisons, given the above constraints.

As yet another example, Divide by 11 can be characterized by P=10 and {j}={4, 6, 7, 8, 10}. Given this, reciprocal R can be calculated based on, $$R = \frac{1}{11} = \sum_{\{j\}} \sum_{i=0}^{\infty} 2^{-(10i+j)} = \frac{1}{1-2^{-10}}(2^{-4} + 2^{-6} + 2^{-7} + 2^{-8} + 2^{-10}).$$

The value for k for a 40-bit dividend would be governed by:

$$Pk > \log(2^{40}) + \log\left(\frac{1}{11}\right) - \log\left(\frac{1}{11} - 2^{-10}\right) = 41$$

or about k=5. In this example, the necessary accumulator width is safely approximated by finding the smallest $\Delta$ which satisfies:

$$\log\left(5 - \frac{\Delta}{10}\right) - \Delta < -10 - 1.$$

The smallest $\Delta=13$, meaning the accumulator should be log(D)+13=53 bits.

The modulo values can be computed from the first P=10 bits to the right of the implicit decimal of Q as depicted in FIG. 4, using exact comparisons, given the above constraints.

It should be noted that when N is a composite number, division may be processed as a composition of divides done over each factor of N. This can, for example, be useful particularly if N is even, or P is large enough for N that the realization of a single divide-by-N is more expensive than dividing by N's factors individually.

In any case, the concept of dividing by N's factors can be explored further by first conceiving of a divide-by-N operation as being a pair of functions $\{q_N(D), r_N(D)\}$ which map a given dividend, D, to the quotient and modulo result (as the reminder in this case) of D w.r.t. N such that $D=Nq_N(D)+r_N(D)$, where $q_N(D)$ can be the largest satisfying integer.

Two general properties can be true for functional compositions of $q_N$ and $r_N$, assuming N is comprised of a pair of factors x and y:

$$q_N(D)=q_{xy}(D)=q_x(q_y(D))=q_{yx}(D)=q_y(q_x(D)); \text{ and} \quad 1)$$

$$r_N(D)=r_{xy}(D)=r_x(D)+x\cdot r_y(q_x(D))=r_{yx}(D)=r_y(D)+y\cdot r_x(q_y(D)). \quad 2)$$

Given that, by the definition, $q_x(D)=y\cdot q_y(q_x(D))+r_y(q_x(D))$ and thus: $D=x\cdot q_x(D)+r_x(D)=xy\cdot q_{xy}(D)+r_{xy}(D)=Nq_N(D)+r_N(D)$.

These two properties enable a general compositional approach to computing both the quotient and modulo when N is a composite number of n factors {F0, F1, . . . , Fn–2, Fn–1}. A generalized compositional approach is illustrated schematically in FIG. 6 in accordance with one embodiment of the invention, where an input value D is divided by N, which is a composite of n factors {F0, F1, . . . , Fn–2, Fn–1}, to produce a quotient $q_N(D)$ and a modulo $r_N(D)$. Divider component 102 (shown in FIG. 1) and the division techniques described above can be used virtually for any application and in any computing system and/or environment to divide values by numbers that are not divisible by two (2) in an efficient manner, where a division can be determined based on a summation of inverse values of powers of two with a determined pattern, and the calculations can be pipelined and performed in parallel.

One such exemplary application is memory mapping which will be described in greater detail below given its importance and usefulness in virtually any computing system, and especially those with relatively large memories.

Figure 7:
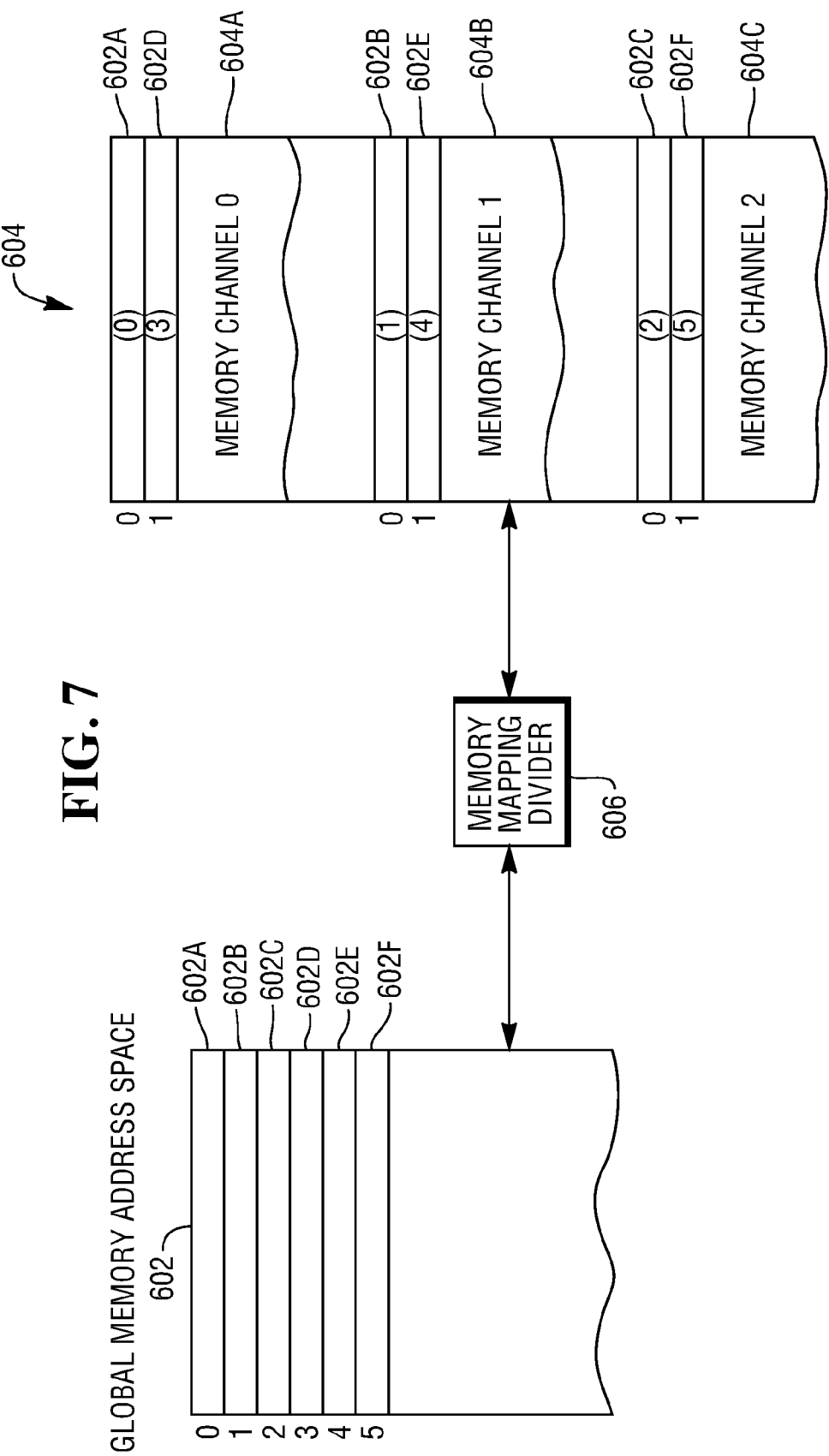
FIG. 7 depicts a global memory address space 602 that has been mapped to a number of memory channels 604 in accordance with one embodiment of the invention.

To further elaborate, FIG. 7 depicts a global memory address space 602 that has been mapped to a number of memory channels 604 using a memory mapping divider 606 in accordance with one embodiment of the invention. Referring to FIG. 7, memory channels 604 can include a memory channel zero (0) 604A, a memory channel one (1) 604B, and a memory channel three (3) 604B.

In the memory mapping scheme depicted in FIG. 7, where three (3) memory channels are used, a first global memory address 602A in the global memory address space 602 can be mapped to the address zero (0) of the memory channel zero (0) 604A, a second global memory address 602B in the global memory address space 602 can be mapped to the address zero (0) of the memory channel one (1) 604B, a third global memory address 602C in the global memory address space 602 can be mapped to the address zero (0) of the memory channel two (0) 604C, a fourth global memory address 602D in the global memory address space 602 can be mapped to the address one (1) of the memory channel zero (0) 604A, a fifth global memory address 602E in the global memory address space 602 can be mapped to the address one (1) of the memory channel one (1) 604B, a sixth global memory address 602F in the global memory address space 602 can be mapped to the address one (1) of the memory channel two (2) 604C, and so on.

Referring to FIG. 7, a memory-mapping divider component 606 can effectively be used to map a global memory address (e.g., a fifth global memory address 602E) to the appropriate address in one of the memory channels 604 by dividing the numerical value of a global memory address (e.g., the numerical value four (4)) by the number of memory channels (three (3)). The resulting quotient of this division would indicate a memory address and the remainder of this division would indicate the memory channel number. As such, the fifth global memory address 602E represented by numerical value four (4) would be mapped to the address one (1) of the memory channel one (1) 604B since division of four (4) by three (3) resulting in one (1) with a remainder of one (1). Moreover, the memory-mapping divider component 606 can divide by numbers including numbers that are not divisible by two (2) using a summation of inverses of powers of two (2) in a similar manner as discussed above, for example, with respect to the divider component 102 (shown in FIG. 1). Although for simplicity, very small numbers were used, it should be noted that memory addresses can be very large as today the size of memory currently ranges in Giga Bytes even for small computers and it is likely to even become larger in the future. Also, virtually any number of channels (e.g., 3, 5, 7, 11) can be selected and supported given that the memory-mapping divider component 606 can perform divisions quickly by allowing the calculation to be pipelined.

Figure 8:
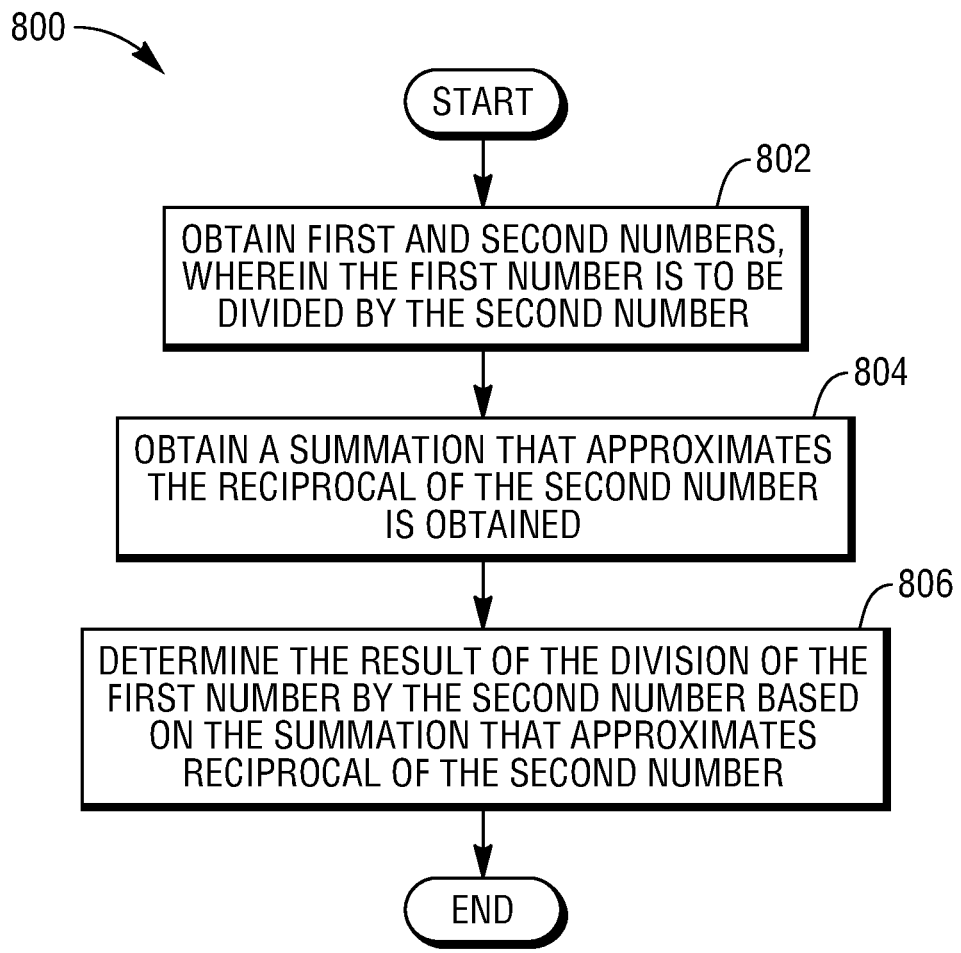
FIG. 8 depicts a method 700 for determining a result for a division of two numbers in accordance with one embodiment of the invention.

To elaborate even further, FIG. 8 depicts a method 700 for determining a result for a division of two numbers in accordance with one embodiment of the invention. The numbers can, for example, be associated with one or more attributes of a computing system (e.g., memory address, number of memory channels). Method 700 can, for example, be used by the divider component 102 (show in FIG. 1).

Referring to FIG. 8, initially, first and second number values are obtained (702). It should be noted that the first number is to be divided by the second number, and least one of the first and second numbers can be associated with one or more attributes of the computing system. Next, after first and second number values are obtained (702), a summation that approximates the reciprocal of the second number is obtained (e.g., determined, received, retrieved) (704). It should be noted that the reciprocal of the second number is equal to the value of one (1) divided by the second number. Thereafter, before the method 700 ends, the result of the division of the first number by the second number is determined (706) based on the summation that approximates the reciprocal of the second number. The result can, for example, include a resulting quotient and a resulting remainder for division of a first integer by a second integer.

Figure 9:
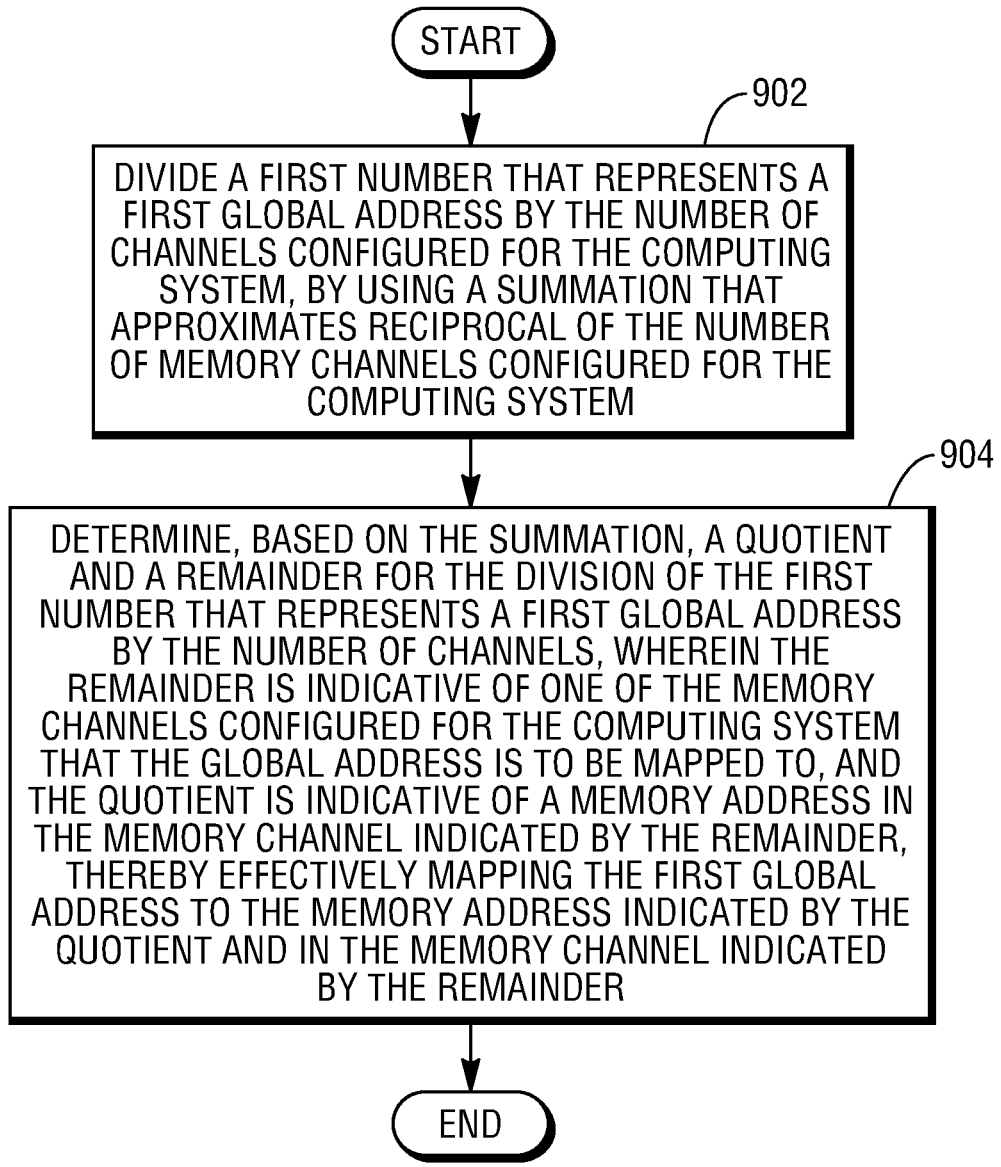
FIG. 9 depicts a method 800 for mapping global memory addresses to channel memory addresses of a computing system in accordance with one embodiment of the invention

FIG. 9 depicts a method 800 for mapping global memory addresses to channel memory addresses of a computing system in accordance with one embodiment of the invention. Method 800 can, for example, be used by the memory-mapping divider component 606 (shown in FIG. 6). Referring to FIG. 8, initially, a first number that represents a first global address is divided (802) by the number of channels configured for the computing system, by using a summation that approximates the reciprocal of the number of memory channels configured for the computing system. Thereafter, based on the summation that approximates reciprocal of the number of channels, a quotient and a remainder for the division of the first number that represents a first global address by the number of channels are determined (804). It should be noted that the remainder is indicative of one of the memory channels configured for the computing system that the global address is to be mapped to, and the quotient is indicative of a memory address in the memory channel indicated by the remainder. As a result, before the method 800 ends, the first global address can be mapped to the memory address indicated by the quotient and in the memory channel indicated by the remainder of division, thereby mapping the first global address to an address in one of the memory channels.

It will be appreciated that this scheme for mapping a global memory space to memory channels can satisfy various needs and/or desires, including the need or desire for a global address space to remain contiguous to all clients (e.g. CPUs, etc.), representing every available location in memory (e.g., RAM), each channel address space to be contiguous (e.g., all RAM in each channel is utilized as fully as possible), and the memory mapping to be a one-to-one relationship (from a Global Address←→{Channel ID, Channel number or Address}. Also, the mapping can be done symmetrically in uniform, or nearly uniform, sizes. Moreover, memory mapping can be performed quickly and cheaply, for example, by using computations in digital logic at hardware speeds for more optimal performance.

Those skilled in the art will also readily appreciate that disclosed techniques for division can, for example, be implemented primarily in a custom, high-speed digital logic (actual HW logic gates) of, for example an FPGA (or ASIC). Among other things, this can serve a need for efficient address mapping by processing elements, which can also likewise be implemented in a custom, high-speed digital logic.

Multi-Node, Parallel Database Systems

The techniques of the invention can be useful for large database systems, including multi-node, parallel database systems partly because of the ever increasing need and desire to store more and more data in such systems. A multi-node parallel database system can, for example, use a massively parallel processing (MPP) architecture or system to perform various database operations in parallel.

Figure 10:
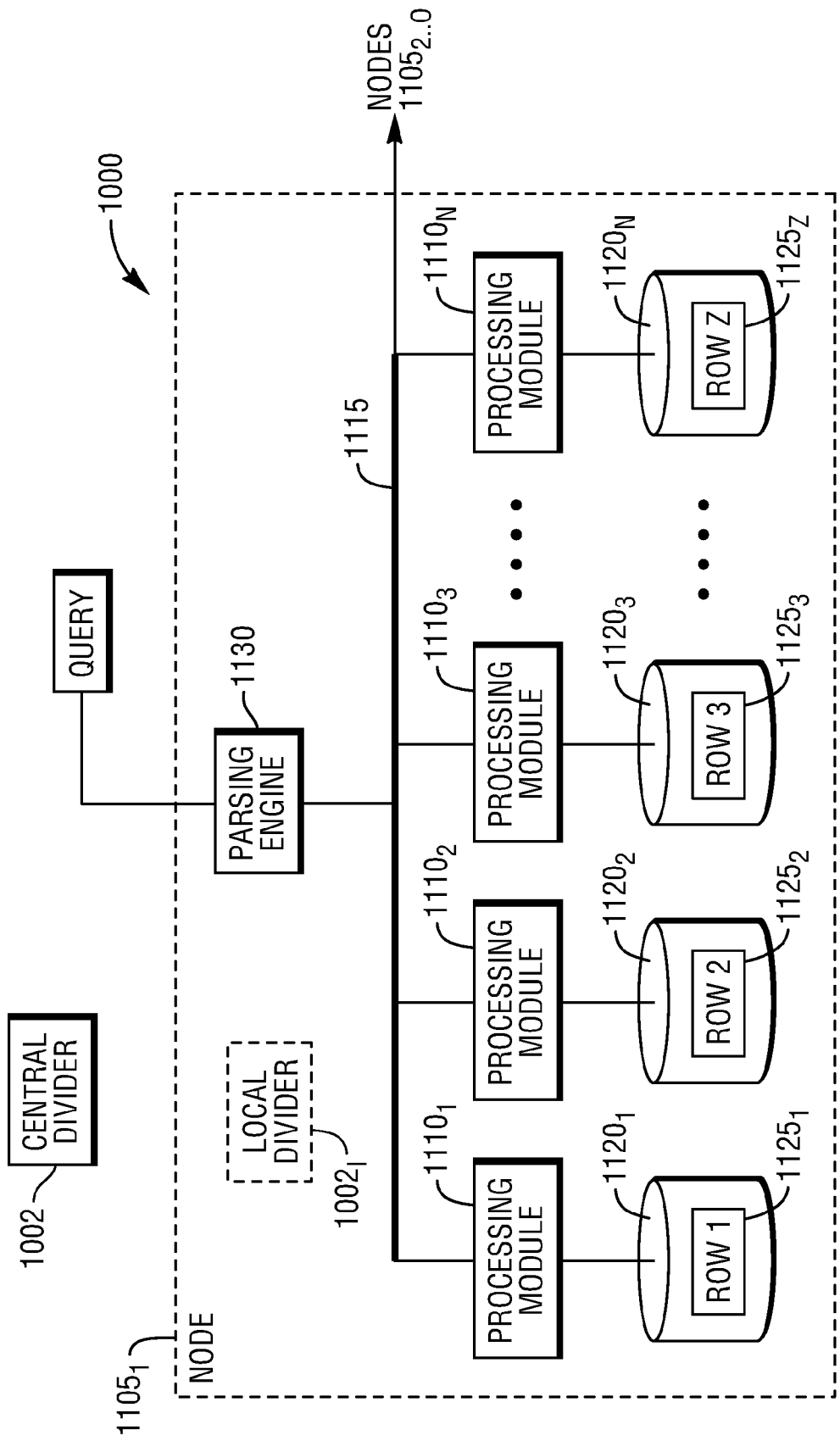
FIG. 10 depicts a database node 1105 of a database system or Database Management System (DBMS) 1000 in accordance with one embodiment of the invention

To further elaborate, FIG. 10 depicts a database node 1105 of a database system or Database Management System (DBMS) 1000 in accordance with one embodiment of the invention. The database system 1000 can, for example, be provided as a Teradata Active Data Warehousing System. It should be noted that FIG. 10 depicts an exemplary architecture for one database node $1105_1$ of the DBMS 1000 in accordance with one embodiment of the invention. Referring to FIG. 10, the DBMS node $1105_1$ includes one or more processing modules 1110-N connected by a network 1115, that manage the storage and retrieval of data in data-storage facilities $1120_{1-N}$. Each of the processing modules 1110-N can represent one or more physical processors or virtual processors, with one or more virtual processors (e.g., Access Module Processer (AMP)) running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. By way of example, if there are four (4) virtual processors and four (4) physical processors, then typically each virtual processor could run on its own physical processor. As such, assuming there are eight (8) virtual processors and four (4) physical processors, the operating system could schedule the eight (8) virtual processors against the four (4) physical processors, in which case swapping of the virtual processors could occur.

In the database system 1000, each of the processing modules $1110_{1-N}$ can manage a portion of a database stored in a corresponding one of the data-storage facilities $1120_{1-N}$. Also, each of the data-storage facilities $1120_{1-N}$ can include one or more storage devices (e.g., disk drives). It should be noted that the DBMS 1000 may include additional database nodes $1105_{2-O}$ in addition to the database node $1105_1$. The additional database nodes $1105_{2-O}$ are connected by extending the network 1115. Data can be stored in one or more tables in the data-storage facilities $1120_{1-N}$. The rows $1125_{1-z}$ of the tables can be stored across multiple data-storage facilities $1120_{1-N}$ to ensure that workload is distributed evenly across the processing modules $1110_{1-N}$. A parsing engine 1130 can organize the storage of data and the distribution of table rows $1125_{1-z}$ among the processing modules $1110_{1-N}$. The parsing engine 1130 can also coordinate the retrieval of data from the data-storage facilities $1120_{1-N}$ in response to queries received, for example, from a user. The DBMS 1000 usually receives queries and commands to build tables in a standard format, such as SQL.

In one implementation, the rows $1125_{1-z}$ are distributed across the data-storage facilities $1120_{1-N}$ by the parsing engine 1130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $1120_{1-N}$ and associated processing modules $1110_{1-N}$ by a hash bucket map. The characteristics of the columns chosen for the primary index determine how evenly the rows are distributed.

Referring again to FIG. 10, it should be noted that a divider component 1002 can be provided for the database system 1000 in accordance with one embodiment of the invention. It will be appreciated that the divider component 1002 can be provided as a separate central entity (or component, or module) severing all of the database nodes 1105 and/or it can at least partially be implemented, for example, in the database node $1105_i$ or one or more other nodes 1105 (not shown). Alternatively, or in addition, the divider component 1002 can be provided in one or more of the processing modules $1110_{1-N}$ of the database node $1105_i$ (not shown) or one or more other nodes 1105 (not shown). In any case, a divider component 1002 can be used to at least facilitate compression/decompression of data objects in one or more database nodes or $1105_i$ if not all of the data objects processed by the database system 1000.

The various aspects, features, embodiments or implementations of the invention described above can be used alone or in various combinations.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile or near-tactile input.

Implementations of the subject matter described in this specification can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A computer-implemented method of memory mapping in a computing system that includes one or more processors, wherein the computer-implemented method comprises:
    obtaining, by a computing system, a global memory address in a global address space as a first number stored in a computer readable form, and a number of memory channels of a memory channel space associated with the global address space as a second number also stored in a computer readable form;
    obtaining, by the computing system, a summation that approximates reciprocal of the second number, wherein the reciprocal of the second number is equal to integer value one (1) divided by the second number, wherein the summation that approximates the reciprocal of the second number includes one or more reciprocal values of powers of an integer; and
    determining, by the computing system, the result of the division of the first number by the second number based on the summation that approximates the reciprocal of the second number by at least determining a quotient and a reminder for the division, respectively representing a memory channel address and a memory channel identifier that identifies one of the memory channels of the memory channel space that the global memory address, thereby effectively mapping the first global address to the a channel memory address indicated by the quotient and in the memory channel indicated by the remainder.

2. The computer-implemented method of claim 1, wherein the one or more reciprocal values are powers of two (2) representing a repeated bit pattern in binary representation of the reciprocal of the second number.

3. The computer-implemented method of claim 1, wherein at least the determining of the result of the division is performed entirely by digital logic in hardware.

4. A computer-implemented method of mapping global memory addresses to channel memory addresses of a computing system, the computer-implemented method comprising:
    dividing a first number that represents a first global address by the number of channels configured for the computing system, wherein the dividing comprises using a summation that approximates reciprocal of the number of memory channels configured for the computing system;

determining, based on the summation that approximates the reciprocal of the number of channels, a quotient and a remainder for the division of the first number that represents a first global address by the number of channels, wherein the remainder is indicative of one of the memory channels configured for the computing system that the global address is to be mapped to, and the quotient is indicative of a memory address in the memory channel indicated by the remainder, thereby effectively mapping the first global address to the memory address indicated by the quotient and in the memory channel indicated by the remainder.

5. The computer-implemented method of claim 4, wherein the summation that approximates reciprocal of the number of channels includes one or more reciprocal values of powers of two (2).

6. The computer-implemented method of claim 5, wherein the one or more reciprocal values of powers of two (2) represent a repeated bit pattern in a binary representation of the reciprocal of the number of channels.

7. The computer-implemented method of claim 6, wherein the repeated bit pattern in the binary representation of the reciprocal of the number of channels are considered in the summation in a accordance with a determined error bound.

8. The computer-implemented method of claim 5, wherein first number that represents a first global address is an integer value, and the number of memory channels is at least one of: a number that is not divisible by two, and a prime number.

9. The computer-implemented method of claim 5, wherein the computer-implemented method comprises: calculating in parallel two of more of the reciprocal values of the powers of two (2) that represent the repeated bit pattern in the binary representation of the reciprocal of the number of channels.

10. A computing system that includes one or more processors operable to:

divide a first number that represents a first global address by the number of channels configured for the computing system, wherein the dividing comprises using a summation that approximates reciprocal of the number of memory channels configured for the computing system;

determine, based on the summation that approximates the reciprocal of the number of channels, a quotient and a remainder for the division of the first number that represents a first global address by the number of channels, wherein the remainder is indicative of one of the memory channels configured for the computing system that the global address is to be mapped to, and the quotient is indicative of a memory address in the memory channel indicated by the remainder, thereby effectively mapping the first global address to the memory address indicated by the quotient and in the memory channel indicated by the remainder.

11. The computing system of claim 10, wherein the summation that approximates the reciprocal of the second number includes one or more reciprocal values of powers of an integer, and wherein the determining of the result of the division comprises: determining at least a quotient and a reminder for the division.

12. The computing system of claim 11, wherein the one or more reciprocal values are powers of two (2) representing a repeated bit pattern in binary representation of the reciprocal of the second number.

13. A non-transient computer readable storage medium storing at least executable computer code for mapping global memory addresses to channel memory addresses of a computing system, wherein when the executable computer code is executed by a computer it causes:

dividing a first number that represents a first global address by the number of channels configured for the computing system, wherein the dividing comprises using a summation that approximates reciprocal of the number of memory channels configured for the computing system;

determining, based on the summation that approximates the reciprocal of the number of channels, a quotient and a remainder for the division of the first number that represents a first global address by the number of channels, wherein the remainder is indicative of one of the memory channels configured for the computing system that the global address is to be mapped to, and the quotient is indicative of a memory address in the memory channel indicated by the remainder, thereby effectively mapping the first global address to the memory address indicated by the quotient and in the memory channel indicated by the remainder.

14. The non-transient computer readable storage medium of claim 13, wherein the summation that approximates reciprocal of the second number includes one or more reciprocal values of powers of an integer.

15. The non-transient computer readable storage medium of claim 13, wherein the one or more reciprocal values of powers of two (2) represent a repeated bit pattern in binary representation of the reciprocal of the second number; and wherein the determining of the result of the division comprises: determining at least a quotient and a reminder for the division.

16. The non-transient computer readable storage medium of claim 13, wherein the first number represents a global memory address in a global address space, and the second number represents a number of memory channels of memory channel space associated with the global address space.

* * * * *